US006070610A

United States Patent [19]

[11] Patent Number: 6,070,610

[45] Date of Patent: Jun. 6, 2000

Owler

[54] FLUID OPERATED TIMER FOR A PLURALITY OF RESERVOIRS

[75] Inventor: Anthony McKenzie Owler, Cobham, United Kingdom

[73] Assignee: Expo Safety Systems Limited, Surrey, United Kingdom

[21] Appl. No.: 08/988,423

[22] Filed: Dec. 10, 1997

[30] Foreign Application Priority Data

Dec. 10, 1996 [GB] United Kingdom .................. 9625622

[51] Int. Cl.[7] .................................................. G05D 11/13

[52] U.S. Cl. ................................ 137/624.2; 137/624.18; 137/256

[58] Field of Search .................................. 137/255, 256, 137/624.11, 624.13, 624.14, 624.18, 624.2

[56] References Cited

U.S. PATENT DOCUMENTS 3,807,422 4/1974 McJones ............................ 137/256 X
4,004,884 1/1977 Zdrodowski .................. 137/624.12 X
4,345,610 8/1982 Herter ............................ 137/624.2 X
4,535,812 8/1985 Miller .............................. 137/624.2 X

*Primary Examiner*—Kevin Lee
*Attorney, Agent, or Firm*—Young & Thompson

[57] ABSTRACT

A fluid operated timer includes an input for the fluid, a reservoir receiving fluid from the input, an actuator responsive to the fluid pressure in the reservoir reaching a threshold value, wherein the reservoir includes a plurality of separate reservoirs. The timer further includes an element for selectively controlling operative connection of at least one of the plurality of separate reservoirs to the input so that the volume of the reservoir presented to the input fluid can be selectively varied.

12 Claims, 1 Drawing Sheet

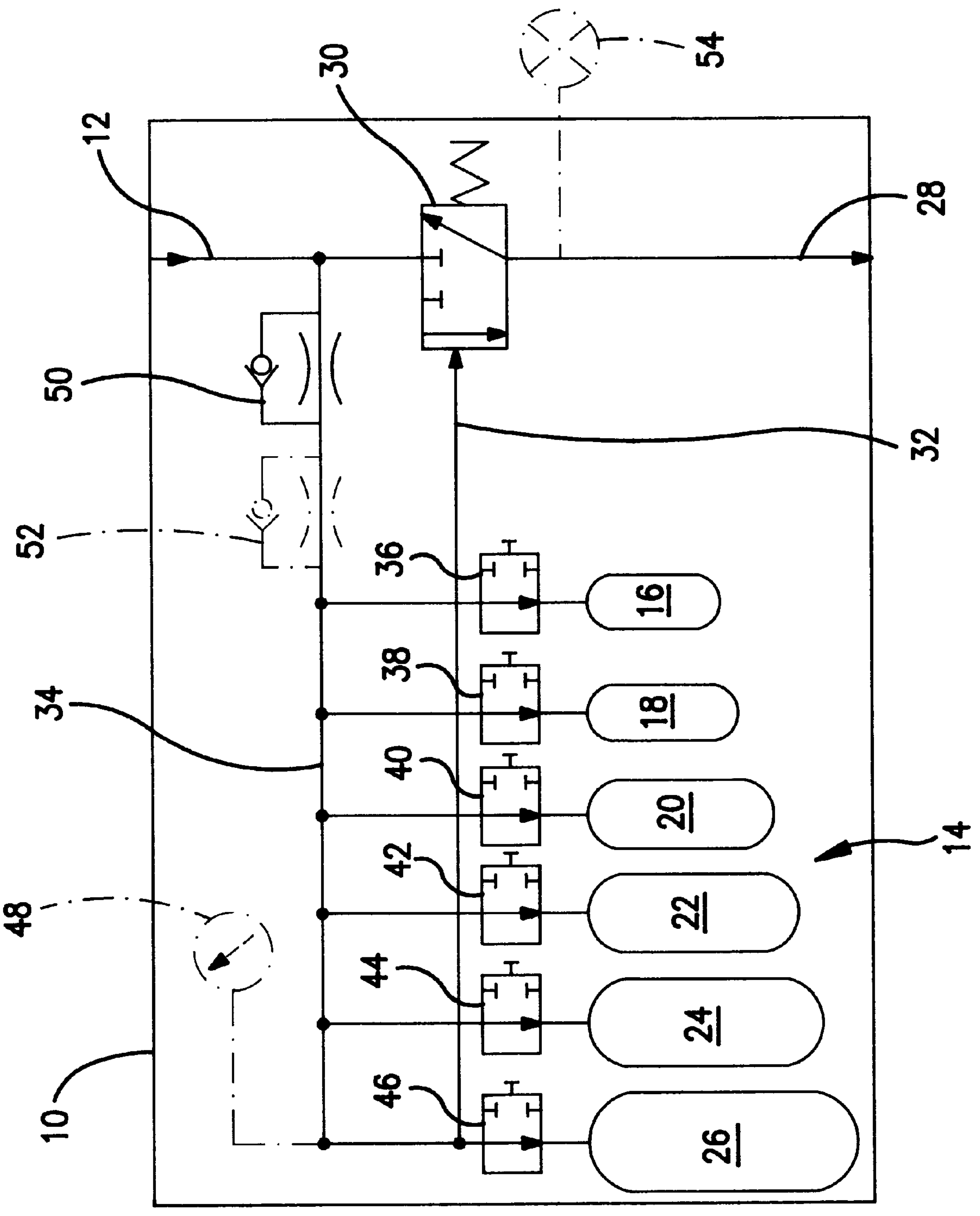
10
12
14
16
18
20
22
24
26
28
30
32
34
36
38
40
42
44
46
48
50
52
54

FLUID OPERATED TIMER FOR A PLURALITY OF RESERVOIRS

The present invention relates to a fluid operated timer and in particular, but not exclusively, to a pneumatic timer.

Pneumatic timers commonly comprise control elements within pneumatic systems in that, merely by virtue of the supply of air thereto, the timer can determine when a particular time period has elapsed and can subsequently provide for an appropriate output. The output can merely indicate that the particular time period has elapsed and/or can actuate an appropriate switch which is arranged to initiate a particular process step or predetermined action within the pneumatic system.

Conventional pneumatic timers include a reservoir into which air is supplied from a source of compressed air and once the pressure within the reservoir has increased to a threshold value, an actuator such as a timer valve is operated which serves to provide an output signal.

The air is supplied to the reservoir by way of a variable timer restrictor which serves to provide for the selective variation of the rate at which the air can be delivered to the reservoir and thus vary the time required before the threshold pressure within the reservoir is reached.

One particular disadvantage that is suffered by such conventional designs is that the time taken to achieve the required air pressure within the reservoir cannot be easily established and maintained by means of the variable timer restrictor. Unless the timer restrictor has a previously calibrated scale for clearly and accurately indicating the manner in which the relevant time period will vary as the timer restrictor is adjusted, and which in any case represents a particularly complex and time consuming process, the variable timer restrictor can only be calibrated in a trial-and-error fashion. If the time period to be set within known pneumatic timers is relatively short, for example less than a minute, such trial-and-error steps might be considered acceptable since the ongoing adjustment of the variable time restrictor to provide for the required one minute period might not be considered to take too long. However, if the required time period is much longer than one minute, for example up to fifteen minutes or more, then a substantial amount of time would be wasted during this trial-and-error process since the earlier attempts to arrive at a near exact fifteen minute period are likely to be close to, but not exactly at, such a fifteen minute period.

Such disadvantages arise particularly in view of the relatively small internal passages found within the adjustable timer restrictor and which are difficult to manufacture to a high degree of tolerance. This further results in different variable time restrictors having widely differing internal passages and such that there is no consistency whatsoever between different variable timer restrictors. The high precision therefore required for such variable time restrictors is disadvantageously difficult, time consuming and expensive to achieve.

The present invention therefore seeks to provide for a fluid operated timer having advantages over known such timers.

In accordance with the present invention there is provided a fluid operated timer comprising an input for the fluid, reservoir means for receiving fluid from the input, actuator means responsive to the fluid pressure in the reservoir means reaching a threshold value, wherein the reservoir means comprises a plurality of reservoirs and the timer further comprises means for selectively controlling operative connection of at least one of the plurality of reservoirs to the input so that the volume of the reservoir means presented to the input fluid can be selectively varied.

Such an arrangement is particularly advantageous since the time period determined by the timer is dependent merely upon the number of reservoirs operatively connected so as to receive the input fluid and such selectively connectable reservoirs can be manufactured in a relatively straight forward manner to a relatively high degree of accuracy.

Advantageously, the timer includes means for selectively controlling the operative connection of each of the plurality of reservoirs to the input. In this manner, the total number of possible time periods to be determined by the timer can be advantageously increased.

Preferably, the means for selectively controlling the operative connection of the reservoir means comprises valve means such as a spool valve, poppet valve, diaphragm valve or pinch valve.

The valve means provides for the manner in which the time period is varied and so the provision of appropriate valve means having simple but reliable and effective operating characteristics is most appropriate for the present invention.

Preferably, each of the plurality of reservoirs presents a different volume to the input fluid.

In particular, the different volumes of the respective plurality of reservoirs are provided so as to differ in an incremental manner. As such, the fluid operated timer of the present invention advantageously comprises an incremental timer system in which a plurality of incremental time periods can be provided in a reliable, quick and cost effective manner.

In accordance with one embodiment of the present invention, the respective volumes of the plurality of reservoirs are arranged such that, with the exception of the smallest volume, each volume is determined to be double that of the next smallest reservoir. Thus, it will be appreciated that the relative ratios of the plurality of reservoirs can be based on the binary number system.

In one particular embodiment, the reservoir means comprises six reservoirs selectively operatively connectable in parallel to the fluid input such that the ratios of the smallest reservoirs to the largest are 1:2:4:8:16:32:.

Advantageously, there is provided at least one timer restrictor formed as part of the passage between the input and the plurality of reservoirs and, in particular, the at least one restrictor comprises a fixed restrictor.

Advantageously, further fixed timer restrictors can be selectively introduced into the aforementioned passage in series with the initial timer restrictor and this advantageously serves to provide for the determination of the increased time periods by way of the timer of the present invention.

Advantageously, the smallest reservoir is provided so as to arrive at the aforementioned threshold pressure after a time period of one minute so that the aforementioned arrangement can provide for time periods from one minute to 63 minutes in one minute increments.

Advantageously, the actuator means is arranged to initiate an indication that the threshold value has been reached and such indication may be provided by audio and/or visual indication means which may be driven by the fluid, or by an electrical supply, or the indication may be indirectly provided by the mere fact that the next step in a particular process or operation commences.

Advantageously, the timer of the present invention also includes indicator means for providing a visual indication of the pressure level within the reservoir means and which can further assist with determining the time elapsed in the particular time period.

In a particular embodiment of the present invention, the aforementioned fluid is gaseous and, in particular, the timer of the present invention can comprise a pneumatic timer which is arranged for selective operation in the aforementioned incremental manner.

The invention is described further hereinafter, by way of example only, with reference to the accompanying drawing which is a block diagram of a pneumatic timer embodying the present invention.

The drawing shows an incremental pneumatic timer 10 embodying the present invention and which includes an air input line 12 which is arranged to receive air from a compressed air source (not shown).

The timer 10 includes reservoir means 14 comprising six separate reservoirs 16–26 which are arranged to receive air supplied by way of the input line 12 in a selectable manner.

The timer 10 includes an air output 28 which is arranged to deliver air from the supply line 12 to an indicator and/or actuator means such as an air horn or electrical switch (not shown) once the selected time period has elapsed. As will be appreciated, the air input line 12 is arranged to be operatively connected to the output line 28 by means of a two position timer valve 30 which either allows for, or inhibits, communication between the supply line 12 and the output line 28. In the position of the timer valve 30 illustrated in the drawing, the air input line 12 is operatively disconnected from the output line 28.

The timer valve 30 is arranged to be operated by means of an air pressure signal line 32 to which each of the reservoirs 16–26 is selectively connectable in parallel. The timer valve 30 is activated when the pressure in the reservoirs 16–26 which are open to the signal line 32 reaches a threshold value.

Air supplied from the supply line 12 when the timer valve 30 is in the position illustrated is supplied by way of supply line branch 34 to each of a plurality of time selector valves 36–46 which are associated with respective ones of the reservoirs 16–26.

The time selector valves 36–46 are likewise connected in parallel to the supply line branch 34 and the air pressure line 32 arranged for the actuation of the timer valve 30 is operatively connected to a common node of the supply line branch 34.

As illustrated in the drawing, each of the time selector valves 36–46 is shown in an open state which allows for operative communication between the supply line branch 34 and each of the reservoirs 16–26.

As will be appreciated from the drawing, the reservoir 16–26 increase in size and the relative increase follows the binary number system in that the reservoir 18 is twice the volume of reservoir 16, reservoir 20 is twice the volume of reservoir 18, reservoir 22 is twice the volume of reservoir 20, reservoir 24 is twice the volume of reservoir 22 and reservoir 26 is twice the volume of reservoir 24.

If, for example, it is assumed that the volume of reservoir 16 is such that, with only valve 36 open and at the particular rate of air supply provided through the input line 12, it would take one minute to achieve the threshold pressure within the reservoir 16, it will therefore be appreciated that the respective time periods for the remaining reservoirs 18–26 are 2 minutes, 4 minutes, 8 minutes, 16 minutes and 32 minutes.

Thus, with all of the time selector valves 36–46 open (as illustrated in the drawing) it will take a total of 63 minutes before the pressure in all of the reservoirs 16–26, and as established at the common node to which the air pressure line 32 is connected, reaches the threshold level required to operate the timer valve 30 so as to open the input line 12 to the output line 28.

Selectively closing any one or more of the timer selector valves 36–46 will therefore simply and accurately reduce the time period for the next operation and, since the relative volume ratios of the reservoirs 16–26 follow the binary number system, any time period from 1 to 63 minutes can be simply, quickly and accurately, selected. For example, if time selector valves 38, 42 and 46 are closed, the pneumatic timer 10 will then be selected to operate to a time period of 21 minutes.

Shown in phantom lines is an indicator gauge 48 which can advantageously be marked with a scale from 0 to 100% so as to indicate how the pressure developed in the reservoirs increases so that the related time period remaining can be easily estimated.

The supply line branch 34 is provided with a fixed restrictor 50 which serves to determine the speed at which the air received by the timer 10 by way of the input line 12 is delivered to the reservoirs 16–26 and, according to a further advantage, a further fixed timer restrictor 52 can be inserted. The further fixed restrictor 52 can preferably be selectively inserted, in series with the initial timer restrictor 50, so as to further increase, for example by 50%, the time period established by any one or more of the reservoirs 16–26.

Once the selected time period has elapsed, the pressure developed in the reservoirs that were selected to be operatively connected to the air supply line 34 serves to operate the timer valve 30. While the timer valve 30 might advantageously be associated directly with an electrical switch or other appropriate switching mechanisms, the timer valve 30 illustrated in the drawing merely serves to provide operative connection between the air supply 12 and the output line 28 such that air is supplied from the compressed source directly to the output 28 which can then advantageously operate any appropriate switching and/or actuating means required.

The illustrated embodiment of the present invention optionally includes an indicator 54 which, particularly for use with a pneumatic timer, comprises an air horn so as to provide an audible indication that the selected time period has elapsed.

As will be appreciated, the present invention exhibits particular advantages in that the variable restrictor is replaced by a fixed restrictor and replaces the fixed reservoir volume with a choice of smaller volume reservoirs. The ratios of the volumes are such that each, or a selected combination, gives a desired increment of the time period.

The reservoir volumes are decided at the design stage and proved by experiment. Thereafter in production the manufacturing tolerances give acceptable times without the need for high precision.

If precise times are required, each timer can be "tuned" by altering the supply pressure up or down to alter the flow rate through the restrictor. Higher pressure gives a higher flow rate and a shorter time period.

The invention is not restricted to the details of the forgoing embodiment. For example, any number of reservoirs can be provided and having sizes determined by the particular timing function required. Also, any appropriate form of actuator can be arranged to be responsive to the threshold pressure being reached.

I claim:

1. A fluid operated timer comprising an input for the fluid, reservoir means for storing fluid received from the input, actuator means responsive to the fluid pressure in the reservoir means reaching a threshold value, wherein the reservoir means comprises a plurality of reservoirs and the timer further comprises means for selectively controlling operative connection of at least one of the plurality of reservoirs to the input so that the volume of the reservoir means presented to the input fluid can be selectively varied.

2. A timer as claimed in claim 1, wherein the means for selectively controlling the operative connection of at least one of the reservoirs comprises one of a spool valve, poppet valve, diaphragm valve and pinch valve.

3. A timer as claimed in claim 1, wherein each of the plurality of reservoirs presents a different volume to the input fluid.

4. A timer as claimed in claim 3, wherein the different volumes of the respective plurality of reservoirs are provided so as to differ in an incremental manner.

5. A timer as claimed in claim 4, wherein the respective volumes of the plurality of reservoirs are arranged such that, with the exception of the smallest volume, each volume is determined to be double that of the next smallest reservoir.

6. A timer as claimed on claim 5, wherein the reservoir means comprises six reservoirs selectively operatively connectable in parallel to the fluid input such that the ratios of the smallest reservoirs to the largest are 1:2:4:8:16:32.

7. A timer as claimed in claim 1, wherein there is provided at least one timer restrictor formed as part of the passage between the input and the plurality of reservoirs.

8. A timer as claimed in claim 7, wherein further fixed timer restrictors can be selectively introduced into the passage in series with the initial timer restrictor so as to determine increased time periods.

9. A timer as claimed in claim 8, wherein the smallest reservoir is provided so as to arrive at the threshold pressure after a time period of one minute so that the fluid operated timer can provide for time periods from one minute to sixty three minutes in one minute increments.

10. A timer as claimed in claim 1, wherein actuator means is provided and arranged to initiate an indication that the threshold value has been reached by one of audio and visual indication means.

11. A timer as claimed in claim 1, and including indicator means for providing a visual indication of the pressure level of the reservoir means and which can further assist with determining the time elapsed in a particular time period.

12. A timer as claimed in claim 1, wherein the fluid is gaseous.

* * * * *